US011380232B2

(12) United States Patent
Wen et al.

(10) Patent No.: US 11,380,232 B2
(45) Date of Patent: Jul. 5, 2022

(54) DISPLAY SCREEN QUALITY DETECTION METHOD, APPARATUS, ELECTRONIC DEVICE AND STORAGE MEDIUM

(71) Applicant: Beijing Baidu Netcom Science Technology Co., Ltd., Beijing (CN)

(72) Inventors: Yawei Wen, Beijing (CN); Jiabing Leng, Beijing (CN); Minghao Liu, Beijing (CN); Yulin Xu, Beijing (CN); Jiangliang Guo, Beijing (CN); Xu Li, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 28 days.

(21) Appl. No.: 16/936,806

(22) Filed: Jul. 23, 2020

(65) Prior Publication Data
US 2020/0349875 A1  Nov. 5, 2020

Related U.S. Application Data

(63) Continuation of application No. PCT/CN2019/083111, filed on Apr. 17, 2019.

(30) Foreign Application Priority Data

Jul. 2, 2018  (CN) .......................... 201810709189.X

(51) Int. Cl.
*G09G 3/00* (2006.01)
*G01N 21/956* (2006.01)

(52) U.S. Cl.
CPC ........... *G09G 3/006* (2013.01); *G01N 21/956* (2013.01); *G09G 2320/103* (2013.01); *G09G 2340/045* (2013.01); *G09G 2340/0407* (2013.01)

(58) Field of Classification Search
CPC ............. G09G 3/006; G09G 2320/103; G09G 2340/0407; G09G 2340/045;
(Continued)

(56) References Cited

U.S. PATENT DOCUMENTS

| 6,177,955 B1* | 1/2001 | Downen ................ G09G 3/006 |
| | | 345/904 |
| 2012/0027286 A1* | 2/2012 | Xu .......................... G01N 21/95 |
| | | 382/149 |

FOREIGN PATENT DOCUMENTS

| CN | 105812746 A | 7/2016 |
| CN | 106645180 A | 5/2017 |

(Continued)

OTHER PUBLICATIONS

First Office Action in KR Patent Application No. 1020197034482 dated Sep. 21, 2020.
(Continued)

*Primary Examiner* — Antonio A Caschera
(74) *Attorney, Agent, or Firm* — Dilworth IP, LLC

(57) ABSTRACT

A display screen quality detection method, an apparatus, an electronic device and a storage medium. The method includes receiving a quality detection request sent by a console deployed on a display screen production line, where the quality detection request includes a display screen image captured by an image capturing device on the display screen production line, performing image preprocessing on the display screen image, and inputting the preprocessed display screen image into a defect detection model to obtain a defect detection result, where the defect detection model is obtained by training with a historical defect display screen image using a deep convolutional neural network structure and an instance segmentation algorithm, determining, according to the defect detection result, quality of a display screen corresponding to the display screen image. The
(Continued)

technical solution has high defect detection accuracy, good system performance, and high business expansion capability.

12 Claims, 3 Drawing Sheets

(58) Field of Classification Search
CPC .. G01N 21/956; G01N 29/44; G01N 29/4418; G01N 29/4427; G01N 29/4481; G06N 3/02
See application file for complete search history.

(56) References Cited

FOREIGN PATENT DOCUMENTS

| | | | |
|---|---|---|---|
| CN | 106952250 | A | 7/2017 |
| CN | 107561738 | A | 1/2018 |
| CN | 108154508 | A | 6/2018 |
| CN | 108230318 | A | 6/2018 |
| CN | 108961238 | A | 12/2018 |
| JP | 2012032369 | A | 2/2012 |
| JP | 2017524183 | A | 8/2017 |
| KR | 101838664 | B1 | 3/2018 |

OTHER PUBLICATIONS

First Office Action in JP Patent Application No. 2019563542 dated Jan. 26, 2021.
English translation of International Search Report issued in International Application No. PCT/CN2019/083111 dated Jul. 19, 2019.
First Office Action issued in CN Patent Application No. 201810709189.X dated Apr. 15, 2019.
Second Office action issued in CN Patent Application No. 201810709189.X dated Jun. 20, 2019.
Decision of Rejection issued in CN Patent Application No. 201810709189.X dated Sep. 11, 2019.
Notice of Allowance in KR Patent Application No. 10-2019-7034483 dated Oct. 10, 2021.

* cited by examiner

DISPLAY SCREEN QUALITY DETECTION METHOD, APPARATUS, ELECTRONIC DEVICE AND STORAGE MEDIUM

CROSS-REFERENCE TO RELATED APPLICATION

This application is a continuation of International Application No. PCT/CN2019/083111, filed on Apr. 17, 2019, which claims priority to Chinese Patent Application No. 201810709189.X, titled "DISPLAY SCREEN QUALITY DETECTION METHOD, APPARATUS, ELECTRONIC DEVICE AND STORAGE MEDIUM", filed on Jul. 2, 2018, by BEIJING BAIDU NETCOM SCIENCE TECHNOLOGY CO., LTD., both of which are hereby incorporated by reference in their entireties.

TECHNICAL FIELD

This disclosure relates to the field of computer technology, and in particular, to a display screen quality detection method, apparatus, electronic device and storage medium.

BACKGROUND

With development of technology, the role of information display technology in people's lives is increasing day by day, display screens are also widely used due to their small size, light weight, low power, high resolution, high brightness and no geometric deformation. However, in a production process of the display screens, display defects, such as point defects, line defects and surface defects may appear on the display screens due to process and environmental reasons. Therefore, display screen quality detection is an important part of the production process.

In the prior art, the display screen quality detection mainly adopts manual detection or machine-assisted manual detection method. Specifically, the manual detection method refers to: industry experts visually observe pictures collected from production environment and give judgments. The machine-assisted manual detection method refers to: first a quality detection system, which is provided with experience of industry experts, is used to detect display screen images to be detected, and then industry experts detect and judge the pictures with suspected defects.

However, both the manual detection method and the machine-assisted manual detection method are affected greatly by subjective factors of humans, and have low detection accuracy, poor system performance and low business expansion capability.

SUMMARY

The present disclosure provides a display screen quality detection method, apparatus, electronic device and storage medium, to overcome a problem that the existing display defect detection methods are affected greatly by subjective factor of humans, resulting in low detection accuracy, poor system performance and low business expansion capability.

A first aspect of the present disclosure provides a display screen quality detection method, including:
receiving a quality detection request sent by a console deployed on a display screen production line, where the quality detection request includes a display screen image captured by an image capturing device on the display screen production line;
performing image preprocessing on the display screen image, where the image preprocessing includes one or more of following processes:
trimming, cutting, rotating, reducing, and zooming;
inputting the preprocessed display screen image into a defect detection model to obtain a defect detection result, where the defect detection model is obtained by training with a historical defect display screen image using a deep convolutional neural network structure and an instance segmentation algorithm; and
determining, according to the defect detection result, quality of the display screen corresponding to the display screen image.

In this embodiment, the defect detection model obtained by training with the historical defect display screen image using the deep convolutional neural network structure and the instance segmentation algorithm performs defect detection on the preprocessed display screen image, to determine the quality of the display screen corresponding to the display screen image, and since the defect detection result obtained by the defect detection model has high classification accuracy and strong intelligence capability, system performance is improved and business expansion capability is high.

In a possible implementation of the first aspect, the defect detection model is obtained by training with a historical defect display screen image using a deep convolutional neural network structure and an instance segmentation algorithm, including:
the defect detection model is a result which is obtained by performing combined training with candidate region loss, region category loss, region boundary loss and pixel instance loss of the historical defect display screen image, such that a total loss value of the candidate region loss, the region category loss, the region boundary loss and the pixel instance loss meets a preset loss threshold;
where the candidate region loss refers to a loss value between a selected defect region and an actual defect region in the historical defect display screen image, the region category loss refers to a loss value between a predicted defect category and an actual defect category in the selected defect region, the region boundary loss refers to a loss between a predicted defect boundary and an actual defect boundary in the selected defect region, and the pixel instance loss refers to a loss between a predicted pixel instance and an actual pixel instance in the historical defect display screen image.

In this embodiment, the defect detection model obtained by performing combined training with the candidate region loss, region category loss, region boundary loss and pixel instance loss of the historical defect display screen image has high classification accuracy and improves the performance of the detection system.

In another possible implementation of the first aspect, inputting the preprocessed display screen image into a defect detection model to obtain a defect detection result, including:
determining a detection model server that hosts a processing resource, according to a load balancing policy; and
inputting the preprocessed display screen image into the defect detection model running on the detection model server to obtain the defect detection result.

In this embodiment, the detection model server is selected according to a load balancing policy, which enables load balancing between servers, improves the detection efficiency of the display screen image, and improves the performance of the display screen quality detection system.

In yet another possible implementation of the first aspect, the defect detection result includes: a defect category, and/or a defect instance, and/or a defect location; and the determining, according to the defect detection result, quality of a display screen corresponding to the display screen image, includes:

determining, according to production stage information and the defect detection result, the quality of the display screen corresponding to the display screen image.

In the embodiment of the present disclosure, the quality of the display screen can be determined with the production stage information being considered, and the subjective influence of humans on the judge result is avoided, and the detection accuracy is improved to a certain extent.

In yet another possible implementation of the first aspect, after determining, according to the defect detection result, the quality of the display screen corresponding to the display screen image, the method further includes:

if it is determined that the display screen is a bad screen, performing one or more of following operations:

sending, through a controller, alarm information to a production manager;

storing, through the controller, the defect detection result in a production database as a log;

sending, through the controller, a production control instruction to the console to eliminate a defect; and inputting, through the controller, the display screen image and the defect detection result into the defect detection model to optimize the defect detection model.

When the display screen quality detection method in the embodiment of the present disclosure runs on the display screen production line for a period of time, the accuracy of the defect detection and defect location can be manually reviewed by the information in the production database, then the training database is updated, and the defect detection model is retrained to improve the defect detection accuracy.

A second aspect of the present disclosure provides a display screen quality detection apparatus, includes:

a receiving module, configured to receive a quality detection request sent by a console deployed on a display screen production line, where the quality detection request includes a display screen image captured by an image capturing device on the display screen production line;

a processing module, configured to perform image preprocessing on the display screen image, and input the preprocessed display screen image into a defect detection model to obtain a defect detection result, where the image preprocessing includes one or more of following processes: trimming, cutting, rotating, reducing, and zooming, and the defect detection model is obtained by training with a historical defect display screen image using a deep convolutional neural network structure and an instance segmentation algorithm; and a determining module, configured to determine, according to the defect detection result, quality of a display screen corresponding to the display screen image.

In a possible implementation of the second aspect, the defect detection model is obtained by training with a historical defect display screen image using a deep convolutional neural network structure and an instance segmentation algorithm, including:

the defect detection model is a result which is obtained by performing combined training with candidate region loss, region category loss, region boundary loss and pixel instance loss of a historical defect display screen image, such that a total loss value of the candidate region loss, the region category loss, the region boundary loss and the pixel instance loss meets a preset loss threshold;

where the candidate region loss refers to a loss value between a selected defect region and an actual defect region in the historical defect display screen image, the region category loss refers to a loss value between a predicted defect category and an actual defect category in the selected defect region, the region boundary loss refers to a loss between a predicted defect boundary and an actual defect boundary in the selected defect region, and the pixel instance loss refers to a loss between a predicted pixel instance and an actual pixel instance in the historical defect display screen image.

In another possible implementation of the second aspect, the processing module is specifically configured to determine a detection model server that hosts a processing resource, according to a load balancing policy, and input the preprocessed display screen image into the defect detection model running on the detection model server to obtain the defect detection result.

In yet another possible implementation of the second aspect, the defect detection result includes: a defect category, and/or a defect instance, and/or a defect location; and the determining module is specifically configured to determining, according to production stage information and the defect detection result, the quality of the display screen corresponding to the display screen image.

In yet another possible implementation of the second aspect, the processing module is further configured to: after the determining module determines, according to the defect detection result, the quality of the display screen corresponding to the display screen image, if it is determined that the display screen is a bad screen, perform one or more of following operations:

sending, through a controller, alarm information to a production manager;

storing, through a controller, the defect detection result in a production database as a log;

sending, through a controller, a production control instruction to the console to eliminate a defect; and inputting, through a controller, the display screen image and the defect detection result into the defect detection model to optimize the defect detection model.

A third aspect of the present disclosure provides an electronic device including a processor, a memory, and a computer program stored on the memory and operable on the processor, when the processor executes the program, the method of any of the first aspect and the various possible implementations of the first aspect is implemented.

A fourth aspect of the present disclosure provides a storage medium, where the storage medium stores instructions, which when run on a computer, cause the computer to perform the method of any of the first aspect and the various possible implementations of the first aspect.

The display screen quality detection method, apparatus, electronic device and storage medium provided by the embodiments of the present disclosure receive a quality detection request sent by a console deployed on a display screen production line, where the quality detection request includes a display screen image acquired by an image capturing device on the display screen production line, perform image preprocessing on the display screen image, and input the preprocessed display screen image into a defect detection model to obtain a defect detection result, and determine, according to the defect detection result, quality of a display screen corresponding to the display screen image. Since the defect detection model is obtained by training with a historical defect display screen image using a deep convolutional neural network structure and an instance segmentation algorithm, the defect detection result obtained by using the defect detection model has high classification accuracy, the system performance is improved, and the business expansion capability is high, which solves the problem that the existing display defect detection methods are affected greatly by subjective factors of humans, resulting in low detection accuracy, poor system performance and low business expansion capability.

DETAILED DESCRIPTION OF THE EMBODIMENTS

In order to make the purpose, technical solution and advantages of the embodiments of the present disclosure more clear, the technical solutions in the embodiments of the present disclosure are clearly and completely described in following with reference to the accompanying drawings in the embodiments of the present disclosure. Obviously, the described embodiments are part of the embodiments of the present disclosure, rather than all of them. Based on the embodiments in the present disclosure, all other embodiments obtained by those skilled in the art without creative efforts are within the scope of the present disclosure.

Figure 1:
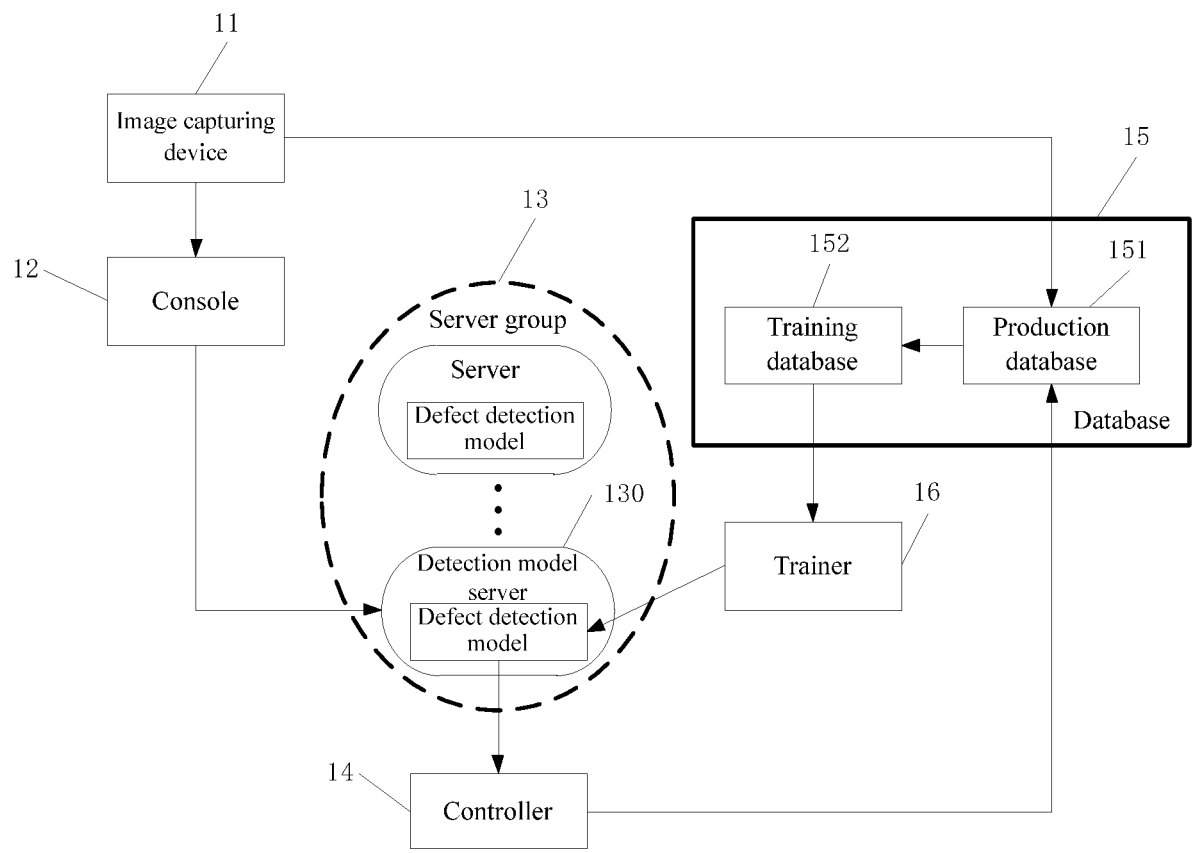
FIG. 1 is a schematic structural diagram of a display screen quality detection system provided by an embodiment of the present disclosure.

A display screen quality detection method provided by the embodiment of the present disclosure is applied to a display screen quality detection system. FIG. 1 is a schematic structural diagram of a display screen quality detection system provided by an embodiment of the present disclosure. As shown in FIG. 1, the display screen quality detection system includes: a plurality of different devices, such as an image capturing device 11, a console 12, a server group 13, a controller 14, a database 15, and a trainer 16 deployed on a display screen production line.

The image capturing device 11 captures a display screen image on the display screen production line, the console 12 receives the display screen image captured by the image capturing device 11 and sends the display screen image to the detection model server 130 in the server group 13, the detection model server 130 inputs the received display screen image into a defect detection model that is running on it to obtain a defect detection result, the controller 14 receives the defect detection result of the detection model server 130, and in combination with production stage information, gives a service response, and the controller 14 may also store the defect detection result in the database 15 as a log. In addition, the display screen image captured by the image capturing device 11 can also be directly stored in the database 15 as raw data for training the defect detection model. The trainer 16 extracts a historical defect display screen image from the database, and then train with the historical defect display screen image using a deep defect convolutional neural network structure and an instance segmentation algorithm to obtain the defect detection model.

In an embodiment, the database 15 may include a production database 151 and a training database 152. The production database 151 may receive and save the defect detection result sent by the controller 14 and the display screen image captured by the image capturing device 11. The training database 152 may store the historical defect display screen image and the corresponding original display screen image extracted from the production database 151 to enable the trainer 16 to train and obtain a defect detection model with high detection accuracy.

In an embodiment, the trainer 16 in the embodiment of the present disclosure may be a training engine implemented by hardware and/or software functions, which is used as a training tool for the defect detection model.

The display screen quality detection system of the embodiment of the present disclosure may further include other entity modules, such as a processor and a memory, which is not limited in the embodiment.

Following is a brief description of the application scene to which the embodiments of the present disclosure is applicable.

Currently, the overall intelligent automation of the 3C industry (3C industry refers to the information appliance industry that integrates the application of computer, communication, and consumer electronics) is low. It can be seen from the investigation and analysis on the industry of display screens, such as mobile phone screens, the detection methods for mobile phone screen used by most of manufacturers can be divided into two types, namely: manual detection method and machine-assisted manual detection method.

The manual detection method refers to: the industry experts visually observe images collected from production environment and give judgements. This method is affected greatly by subjective factors of humans, has low detection efficiency, and does great harm to human eyes. In addition, since production workshop of display screen is generally a dust-free environment, staffs need to prepare for cleaning before entering, and wearing dust-free clothes, which may also adversely affect the health and safety of the staffs.

The machine-assisted manual detection method can also be called a detection method based on a liquid crystal module detection device, and the specific principle is: firstly, a quality detection system with certain judgment ability filters out images without defects, and then industry experts detect and judge images with suspected defects. In the machine-assisted manual detection method, the quality detection system is mostly developed from the expert system and the characteristic engineering system, it means that the expert experience is solidified in the quality detection system, so that it has certain automation ability. Therefore, the machine-assisted manual detection method has low accuracy and poor system performance, and cannot cover all testing standards of the manufacturer. Moreover this method is also inefficient and easy to miss and misjudge defects, however, image data after detection is difficult to be used for secondary exploitation. In addition, in the quality detection system, the characteristics and judgment rules are solidified into the machine according to the experience of industry experts, and it is difficult to iterate with the development of the business, resulting in that the detection accuracy of the quality detection system becomes lower and lower with the development of the production process, and may even be reduced to a state of being completely unusable. Further, the characteristics of the quality detection system are presolidified in hardware by third-party suppliers, and when upgrading, the production line needs to be substantially transformed, and in addition the cost is very high, and it has obvious deficiencies in terms of safety, standardization and expansion capability, which is not conducive to the optimization and upgrading of the display screen production line, and the business expansion capability is low.

In view of the above, both the manual detection method and the machine-assisted manual detection method have following disadvantages: they are inefficient and prone to misjudgment, and the industrial data generated by the two methods is not easy to store, manage, and re-mine and reuse.

The embodiment of the present disclosure develops an automatic, high-precision display screen quality detection method according to the latest development of artificial intelligence technology in computer vision, uses the image of the display screen captured by the image capturing device in real time on the display screen production line, and detects and judges the surface quality of the display screen in real time, and if a quality problem is detected in the display screen captured by the current image capturing device, the location of the quality problem in the picture and its category and category instance are determined.

It should be noted that the embodiments of the present disclosure can be applied to any scene of performing display screen detection by using human eyes and computer vision. The display screen in this embodiment may include any one of following: a plasma screen, a liquid crystal display (LCD) screen, a light emitting diode (LED) screen, and an organic light-emitting diode (OLED) screen, etc. The embodiments of the present disclosure are not limited to the screens mentioned above, and may also include other display screens, which are not described herein again.

In an embodiment, the quality problem described in the embodiment of the present disclosure may include, but are not limited to, different types of defect problems including point defect, line defect, surface defect, and mura, which will not be introduced one by one herein. In an embodiment, mura refers to various trace phenomena caused by uneven brightness of the display screen.

The technical solutions of the present disclosure are described in detail below through specific embodiments. It should be noted that following specific embodiments may be combined with each other, and the same or similar concepts or processes may not be repeated in some embodiments.

In the embodiments of the present disclosure, "multiple" means two or more. "And/or", describes the association relationship of associated objects, indicating that there can be three kinds of relationships, for example, A and/or B, indicating that there are three cases where only A exists, both A and B exist, and only B exists. The character "/" generally indicates that the contextual objects are in an "or" relationship.

Figure 2:
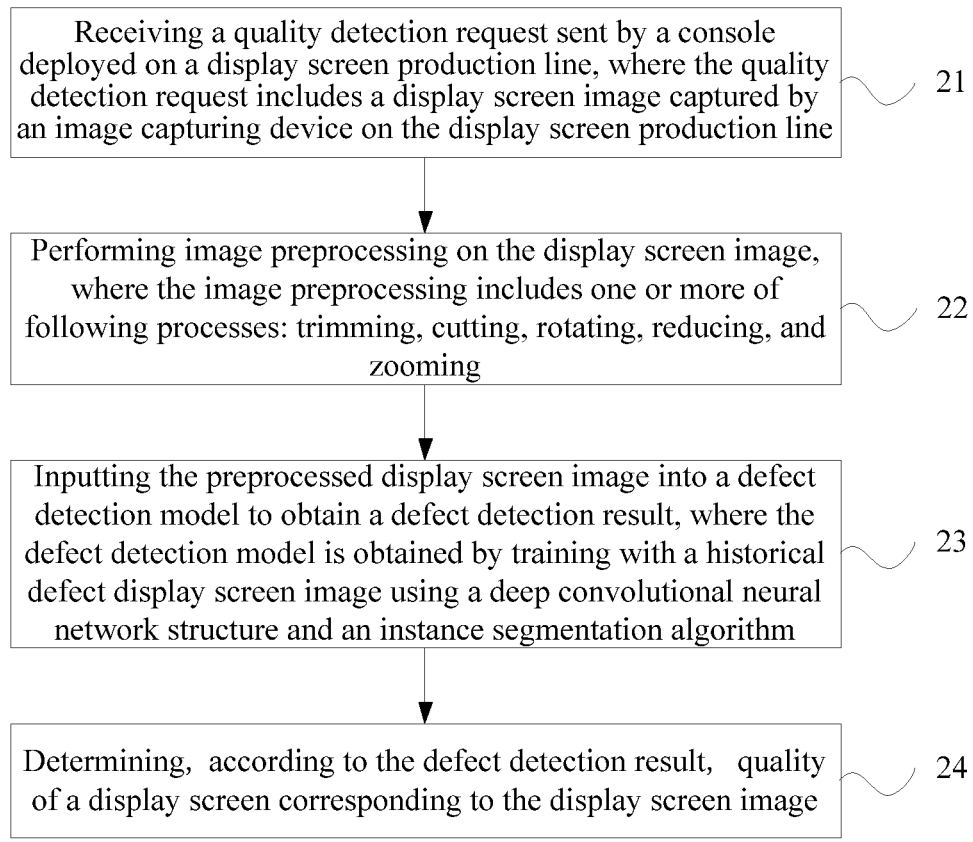
FIG. 2 is a schematic flow chart of Embodiment 1 of a display screen quality detection method provided by an embodiment of the present disclosure.

FIG. 2 is a schematic flow chart of Embodiment 1 of a display screen quality detection method provided by an embodiment of the present disclosure. As shown in FIG. 2, in the embodiment of the present disclosure, the display screen quality detection method can include following steps:

Step 21: receiving a quality detection request sent by a console deployed on a display screen production line, where the quality detection request includes a display screen image captured by an image capturing device on the display screen production line.

In the embodiment of the present disclosure, a variety of different devices, such as an image capturing device, a console, a server group, a controller, and a database are deployed on the display screen production line. The image capturing device can be a high-precision image acquisition camera, and during the production process of display screen, multiple display screen images corresponding to display screens on the display screen production line can be captured by adjusting the angle, light, filter, zoom lens, focus, etc. of the image capturing device.

After the display screen image is captured by the image capturing device on the display screen production line, the console deployed on the display screen production line may send a quality detection request to the server group, on which the defect detection model is deployed, on the display screen production line, the quality detection request includes the display screen image captured by the image capturing device, so that a server receiving the quality detection request in the server group processes the received display screen image.

Step 22: performing image preprocessing on the display screen image, where the image preprocessing includes one or more of following processes: trimming, cutting, rotating, reducing, and zooming.

In the embodiment of the present disclosure, the image capturing device deployed on the display screen production line is generally a high-precision camera, therefore, the display screen image captured by using the image capturing device may be large in size or have a large amount of pixels, or is not in a suitable position, etc. Therefore, after receiving the display screen image included in the quality detection request sent by the console, it is necessary to preprocess the display screen image according to the actual situation.

For example, if the display screen image has a large edge region, the display screen image may then be trimmed to retain a useful portion of the display screen image, or if the display screen image is large in size, the display screen image may then be cut and reduced, so that the display screen image sent into the defect detection model can be completely detected, thereby improving the detection precision of the display screen. Or, if it is necessary to focus on detecting a certain region in the display screen image, the region in the display screen image may be enlarged and processed to make the preprocessed display screen image conform to a detection standard.

In the display screen quality detection method of the embodiment of the present disclosure, before the display screen image is input into the defect detection model to obtain the defect detection result, the display screen image is performed with pre-processing, such as trimming or/and cutting or/and rotating or/and reducing or/and zooming, so that the display screen image fed into the defect detection model can conform to the detection standard, which lays a foundation for subsequent defect detection in the display screen image, and improves the detection accuracy of the display screen quality.

Step 23: inputting the preprocessed display screen image into a defect detection model to obtain a defect detection result, where the defect detection model is obtained by training with a historical defect display screen image using a deep convolutional neural network structure and an instance segmentation algorithm.

In an embodiment, the server that receives the quality detection request inputs the preprocessed display screen image in the quality detection request into a defect detection model running on the server, and the defect detection model performs the defect detection to obtain the defect detection result.

It is worth noting that the defect detection model running on the server is obtained by training with the historical defect display screen image using the deep convolutional neural network structure and the instance segmentation algorithm. That is, the display screen image on the display screen production line is used as an input of the defect detection model, the deep convolutional neural network structure and the instance segmentation algorithm are used to extract the features in the display screen image (i.e., defects existing in the display screen image) as an output of the defect detection model, then the defect detection model is trained.

Specifically, the instance segmentation means that a machine can automatically determine different instances from an image by using a target detection method, and then use a semantic segmentation method to perform pixel-by-pixel labeling in different instance regions. It is worth noting that semantic segmentation does not distinguish between different instances belonging to a same defect category, and instance segmentation needs to distinguish which pixels belong to which instance of a certain defect category. Therefore, in the embodiment of the present disclosure, the defect detection model is obtained by training with a large number of historical defect display screen images using the deep convolutional neural network structure and the instance segmentation algorithm, that is to say, firstly determine the different defect instances existing in the historical defect display screen images, and then segment the defects in the image and the specific instances corresponding to the defects from the perspective of pixels, and mark them in the display screen image, and finally, perform classification and counting, and combined training to obtain the defect detection model.

As an example, the defect detection model in the embodiment of the present disclosure is obtained by training with the historical defect display screen image using the deep convolutional neural network structure and the instance segmentation algorithm, which can be explained as follows:

the defect detection model is a result obtained by performing combined training with candidate region loss, region category loss, region boundary loss and pixel instance loss of the historical defect display screen image, such that the total loss value of the candidate region loss, the region category loss, the region boundary loss and the pixel instance loss meets a preset loss threshold.

The candidate region loss refers to a loss value between a selected defect region and an actual defect region in the historical defect display screen image, the region category loss refers to a loss value between a predicted defect category and an actual defect category in the selected defect region, the region boundary loss refers to a loss value between a predicted defect boundary and an actual defect boundary in the selected defect region, and the pixel instance loss refers to a loss value between a predicted pixel instance and an actual pixel instance in the historical defect display screen image.

In the embodiment of the present disclosure, the defect detection model is based on the structure of convolutional neural networks (CNNs), the structure of a convolutional neural network is mainly composed of a convolutional layer, a pooling layer, a fully connected layer, and the like, the selection of the granularity and layers of the convolutional neural network can be determined according to actual conditions, which is not limited in the embodiment of the present disclosure. The convolution operation of the convolutional layer refers to the process of performing scanning convolution on the display screen image, or on the image feature map obtained by at least one convolution process, by using convolution kernels that have different weights, to extract various categories of features and obtain an image feature map. The convolution kernel is a weight matrix, that is, the weights used in the convolution are represented by a matrix, which has the same size as the corresponding image region, and it has odd number of rows and columns, and is a weight matrix. The pooling operation of the pooling layer refers to performing dimension reduction operation on the feature map outputted by the convolutional layer and retaining the main features in the feature map. In the CNN network, the fully connected layer maps the feature map generated by the convolution layer into a feature vector of a fixed length (generally the number of image categories in the input image data set), this feature vector contains combined information of all the features of the input image, which retains the most characteristic image features in the image to complete the image classification task.

The embodiment of the present disclosure can utilize such a deep neural network model with convolution, pooling, and full connection operations, and it has high robustness to the deformation, blur and illumination changes etc. of the display screen image captured by the image capturing device on the display screen production line, and has higher generalization for classification tasks.

In this embodiment, the instance segmentation algorithm may be a Mask RCNN algorithm, which adds a network branch of instance segmentation based on a Faster RCNN algorithm. The network branch is to, for a feature map extracted by the Faster RCNN algorithm, restore the feature map to the original image size of the display screen image according to a binary interpolation method, and for each pixel, predict an instance it belongs to, that is, obtain a predicted pixel instance. For each pixel's prediction result, cross-entropy operation is performed on the pixel's prediction result and an actual pixel instance to obtain a pixel instance loss. Subsequently, the pixel instance loss is combined with the loss of the Faster RCNN algorithm, and combined training is performed to obtain the defect detection model.

The Faster RCNN algorithm is the basis of the Mask RCNN algorithm. The Faster RCNN algorithm first uses a convolution operation of the convolutional neural network structure to obtain its feature map, and then calculates whether the selected defect region of the display screen image contains a specific defect. If a defect is included, on the one hand, the loss value between the selected defect region and the actual defect region (candidate region loss) can be calculated, on the other hand, the convolutional neural network can be used for performing feature extraction, then defect categories and defect boundaries in selected defect regions are predicted, then the loss value between the predicted defect category and the actual defect category in the selected defect region (region category loss) and the loss value between the predicted defect boundary and the actual defect boundary in the selected defect region (region boundary loss) are calculated. If the selected defect region of the display screen image does not contain a specific defect, it is not classified.

In summary, the defect detection model is a result obtained by combined training with candidate region loss, region category loss, region boundary loss and pixel instance loss of a historical defect display screen image, a loss function including the candidate region loss, the region category loss, the region boundary loss, and the pixel instance loss can be obtained, the loss function is used to evaluate the difference between the output of the convolutional neural network and the actual value in the training phase of the defect detection model, and then the weight values between respective neurons are updated by using the value of the loss function. The purpose of training the convolutional neural network is to minimize the loss function value.

The training is stopped when the error value between the output of the defect detection model and the defect result marked in the display screen image is less than a preset loss threshold. The preset loss threshold refers to a value that meets a display screen business requirement.

It is worth noting that in the embodiment of the present disclosure, for different production scenes and display screen image characteristics, the depth of the deep convolutional neural network, the number of neurons per layer, and the organization of the convolutional layer and the pooled layer required for training the defect detection model may be different, it can be determined according to the actual situation, which is not limited in this embodiment.

Step 24: determining, according to the defect detection result, quality of a display screen corresponding to the display screen image.

In the embodiment of the present disclosure, after the defect detection result is obtained according to the defect detection model, the quality of the display screen corresponding to the display screen image may be determined according to the defect detection result.

In an embodiment of the present disclosure, the defect detection result may include: a defect category, and/or a defect instance, and/or a defect location.

In this embodiment, when there is a defect in the display screen image, the defect detection result that can be obtained by the defect detection model may include a defect category (all defect categories on the display screen), a defect instance (which one of which defect category the defect on the display screen belong to, which means the specific number of defects for each defect category can also be known), and a defect location (specific location of each defect). That is to say, the defect detection model of the embodiment of the present disclosure can detect the defect categories existing in the display screen image, and the specific number of each defect category.

Correspondingly, the Step 24 (determining, according to the defect detection result, quality of a display screen corresponding to the display screen image) can be replaced by following step:

determining, according to production stage information and the defect detection result, the quality of the display screen corresponding to the display screen image.

Specifically, different display screen manufacturers, different display screen production environments, different types of display screen and other different production stage information may result in different defect detection results in the display screen quality detection process. For example, a liquid crystal display screen generally goes through production stages of thin film transistor processing, color filter processing, cell assembly, module assembly, etc. A LED screen generally goes through the stages of patch, plug-in, wave soldering, post-welding, testing, module assembly, etc. For different types of display screens, the production stages they experience are different, and therefore, when analyzing the defect detection result obtained above, the production stage information of each display screen needs to be considered to determine the quality of the display screen.

The display screen quality detection method provided by the embodiment of the present disclosure receives a quality detection request sent by a console deployed on a display screen production line, where the quality detection request includes a display screen image acquired by an image capturing device on the display screen production line, performs image preprocessing on the display screen image, inputs the preprocessed display screen image into the defect detection model to obtain a defect detection result, and determines, according to the defect detection result, the quality of the display screen corresponding to the display screen image. Since the defect detection model is obtained by training with a historical defect display screen image using a deep convolutional neural network structure and an instance segmentation algorithm, the defect detection result obtained by using the defect detection model has high classification accuracy, strong intelligence capability, improved system performance, and high business expansion capability.

Figure 3:
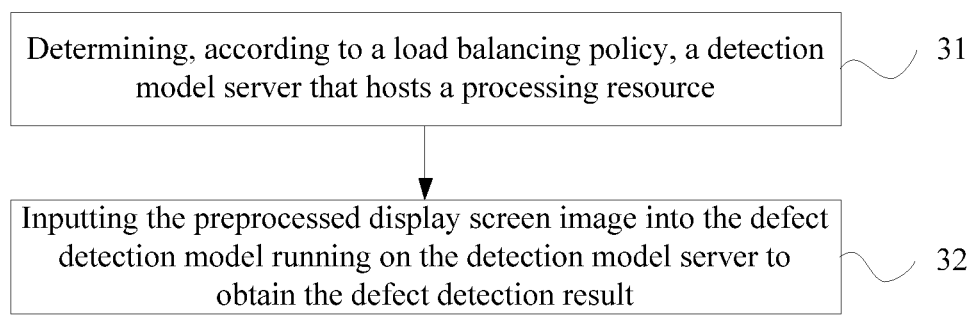
FIG. 3 is a schematic flow chart of Embodiment 2 of a display screen quality detection method provided by an embodiment of the present disclosure.

In an embodiment, on the basis of the above embodiment, FIG. 3 is a schematic flow chart of Embodiment 2 of a display screen quality detection method provided by an embodiment of the present disclosure. As shown in FIG. 3, in this embodiment, the Step 23 (inputting the preprocessed display screen image into a defect detection model to obtain a defect detection result) can be implemented by following steps:

Step 31: determining, according to a load balancing policy, a detection model server that hosts a processing resource.

In the embodiment of the present disclosure, a server group is deployed on the display screen production line. The server group may include multiple servers, and each server runs a defect detection model. In an embodiment, the defect detection model running on each server is the same, so each server can receive the quality detection request sent by the console and then use the defect detection model hosted on it to perform quality detection on the display screen image.

As an example, since the image capturing device deployed on the display screen production line captures the display screen image in real time, the console can also send a quality detection request to any server in the server group in real time.

In an embodiment, since the defect detection model running on each server in the server group is the same, in order to improve the detection efficiency of the defect detection model on the server and ensure the load balancing between the defect detection models, a detection model server hosting a processing resource may be determined from the server group according to a preset load balancing policy, that is, load balancing and scheduling may be performed in real time according to the deployment situation of the defect detection models on the display screen production line.

Step 32: inputting the preprocessed display screen image into the defect detection model running on the detection model server to obtain the defect detection result.

In the embodiment of the present disclosure, after determining the detection model server hosting the processing resource from the server group, the preprocessed display screen image may be input into the defect detection model running on the detection model server, and the defect detection model is used to detect defects on the preprocessed display screen image to obtain the defect detection result. In an embodiment, the defect detection model is obtained through training by a training module using the deep convolutional neural network structure and the instance segmentation algorithm with the historical defect display screen image.

The display screen quality detection method provided by the embodiment of the present disclosure determines a detection model server that hosts a processing resource according to a load balancing policy, and input the preprocessed display screen image into the defect detection model running on the detection model server to obtain the defect detection result, and thus it can achieve load balancing between servers, improve the detection efficiency of the display screen image, and improve the performance of the display screen quality detection system.

In the display screen quality detection method provided by the embodiment of the present disclosure, after the Step 23 (determining, according to the defect detection result, quality of a display screen corresponding to the display screen image), it can include following steps:

if it is determined that the display screen is a bad screen, then performing one or more of following operations:

sending, through a controller, alarm information to a production manager;

storing, through the controller, the defect detection result into a production database as a log;

sending, through the controller, a production control instruction to the console to eliminate a defect; and inputting, through the controller, the display screen image and the defect detection result into the defect detection model to optimize the defect detection model.

In the embodiment of the present disclosure, a tester can pre-set a solution to be performed when it is determined that the display screen is a bad screen, according to production scene and production stage information of the display screen, for example, sending, through the controller, alarm information to a production manager, and/or, storing, through a controller, the defect detection result into a production database as a log, and/or, sending, through a controller, a production control instruction to the console to eliminate a defect, and/or, inputting the display screen image and the defect detection result into the defect detection model to optimize the defect detection model, and the like.

Specifically, as an example, when it is determined, according to the defect detection result, that the display screen corresponding to the display screen image is a bad screen, that is, when there is a defect in the display screen, an alarm message may be sent to enable the production manager to locate the category and position of the defect in time and provide a solution.

As another example, when it is determined, according to the defect detection result, that there is a defect in the display screen, the defect detection result may be stored through the controller into the production database as a log, that is, the defect category, and/or the defect instance, and/or the defect location of the display screen may be stored in the production database as a log, which can then be filtered into a training database, and the defect detection model can be updated by a training module (which may be a software program such as a training engine) according to a defective display screen image.

As yet another example, when it is determined, according to the defect detection result, that there is a defect in the display screen, a production control instruction may also be sent through the controller to the console to eliminate a defect. That is, the detection model server hosting the defect detection model can determine a reason of the defect through the controller, and the production process is adjusted accordingly, that is, the detection model server sends a production control instruction to the console through the controller to eliminate the defect appearing on the display screen, thereby reducing the probability of occurrence of a bad screen.

As yet another example, when it is determined, according to the defect detection result, that there is a defect in the display screen, the display screen image and the defect detection result may also be input into the defect detection model directly to optimize the defect detection model, that is, the display screen image corresponding to the bad screen is directly used as the input of the defect detection model, and the defect detection result of the bad screen is used as the output of the defect detection model to optimize the defect detection model, thereby improving the detection accuracy of the defect detection model.

It should be noted that, the one or more operations performed by the detection model server when it is determined that the display screen is a bad screen is not limited in the embodiment of the present disclosure, which may be determined according to actual conditions, and details are not described herein again.

In an embodiment, for a plurality of different devices, such as an image capturing device, a console, a server group, a controller, and a database, which are deployed on the display screen production line, the operation steps corresponding to the display screen quality detection method may be distributed to the plurality of different devices to perform. For example, the image capturing device captures a display screen image, and the console sends the display screen image captured by the image capturing device to the detection model server in the server group according to the load balancing policy, the defect detection model running on the detection model server pre-preprocesses the display screen image and then performs defect detection and gives the defect detection result. The detection model server can send the defect detection result to the controller, on the one hand, the controller make a response, such as alarm, saving a log, controlling a production control instruction, etc., which is compliant with the actual business scene requirement, considering the actual business scene and according to the business requirement and the defect detection result; on the other hand, the controller may further store the defect detection result and the processing behavior of the response into the production database as a log, so that the training module updates the obtained defect detection model according to the display screen image and the defect detection result in the training database, where the training database stores data such as defective display screen images and corresponding defect detection results filtered from the production database.

It is worth noting that, for each optimized defect detection model, the defect detection model running on the server can be gradually replaced in a small flow on-line manner to achieve the purpose of dynamically expanding the defect detection model with the business scene and production stage information. When the display screen quality detection method in the embodiment of the present disclosure runs on the display screen production line for a period of time, the information in the production database can be manually used to review the accuracy of the defect detection and defect location, then the training database is updated, and the defect detection model is retrained to improve the defect detection accuracy.

An apparatus embodiment of the present disclosure is described below, which may be used to perform the method embodiment of the present disclosure. For the details not disclosed in the apparatus embodiment of the present disclosure, please refer to the method embodiment of the present disclosure.

Figure 4:
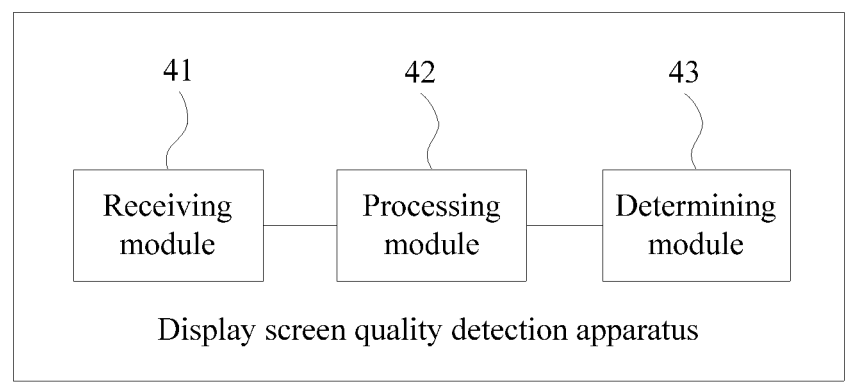
FIG. 4 is a schematic structural diagram of an embodiment of a display screen quality detection apparatus provided by an embodiment of the present disclosure.

FIG. 4 is a schematic structural diagram of an embodiment of a display screen quality detection apparatus provided by an embodiment of the present disclosure. As shown in FIG. 4, the display screen quality detection apparatus provided by the embodiment of the present disclosure may include: a receiving module 41, a processing module 42 and a determining module 43.

The receiving module 41 is configured to receive a quality detection request sent by a console deployed on a display screen production line, where the quality detection request includes a display screen image captured by an image capturing device on the display screen production line.

The processing module 42 is configured to perform image preprocessing on the display screen image and input the preprocessed display screen image into a defect detection model to obtain a defect detection result.

The image preprocessing includes one or more of following processes:

trimming, cutting, rotating, reducing, and zooming, and the defect detection model is obtained by training with a historical defect display screen image using a deep convolutional neural network structure and an instance segmentation algorithm.

The determining module 43 is configured to determine, according to the defect detection result, quality of a display screen corresponding to the display screen image.

In an embodiment, the defect detection model is obtained by training with a historical defect display screen image using a deep convolutional neural network structure and an instance segmentation algorithm, including:

the defect detection model is a result obtained by performing combined training with candidate region loss, region category loss, region boundary loss and pixel instance loss of the historical defect display screen image, such that a total loss value of the candidate region loss, the region category loss, the region boundary loss and the pixel instance loss meets a preset loss threshold.

The candidate region loss refers to a loss value between a selected defect region and an actual defect region in the historical defect display screen image, the region category loss refers to a loss value between a predicted defect category and an actual defect category in the selected defect region, the region boundary loss refers to a loss between a predicted defect boundary and an actual defect boundary in the selected defect region and the pixel instance loss refers to a loss between a predicted pixel instance and an actual pixel instance in the historical defect display screen image.

In a possible implementation of the present disclosure, the processing module 42 is specifically configured to determine, according to a load balancing policy, a detection model server that hosts a processing resource, and input the preprocessed display screen image into the defect detection model running on the detection model server to obtain the defect detection result.

In another possible implementation of the present disclosure, the defect detection result includes: a defect category, and/or a defect instance, and/or a defect location.

The determining module 43 is specifically configured to determine, according to production stage information and the defect detection result, the quality of the display screen corresponding to the display screen image.

In yet another possible implementation of the present disclosure, the processing module 42 is further configured to: after the determining module 43 determines, according to the defect detection result, the quality of the display screen corresponding to the display screen image, if it is determined that the display screen is a bad screen, perform one or more of following operations:

sending through a controller alarm information to a production manager;

storing through the controller the defect detection result in a production database as a log;

sending through the controller a production control instruction to the console to eliminate a defect; and inputting the display screen image and the defect detection result into the defect detection model to optimize the defect detection model.

The display screen quality detection apparatus of the present embodiment can be used to implement the implementations of the method embodiments shown in FIG. 2 and FIG. 3, the specific implementations and technical effects are similar, and the details are not described herein again.

The embodiment of the present disclosure further provides an electronic device, including a processor, a memory, and a computer program stored on the memory and operable on the processor, when the processor executes the program, the steps of the display screen quality detection method as shown in the method embodiments shown in FIG. 2 and FIG. 3 above are implemented.

The present disclosure further provides a storage medium having instructions stored therein that, when run on a computer, cause the computer to perform the methods of the method embodiments as shown in FIGS. 2 and 3.

The disclosure further provides a program product, the program product comprising a computer program, the computer program being stored in the storage medium. At least one processor of a display screen quality detection apparatus can read the computer program from the storage medium, and the at least one processor executes the computer program such that the display screen quality detection apparatus performs the methods of the method embodiments shown in FIGS. 2 and 3.

A person of ordinary skill in the art may understand that all or part of the steps for implementing the foregoing method embodiments may be completed by hardware related to program instructions. The aforementioned program can be stored in a computer readable storage medium. When the program is executed, the steps including the foregoing method embodiments are performed; and the foregoing storage medium includes: various medium that can store program codes, such as a ROM, a RAM, a magnetic disk, or an optical disk.

Finally, it should be noted that the embodiments are only used to explain the technical solutions of the present disclosure, but not to limit; although the present disclosure has been described in detail with reference to the foregoing embodiments, those skilled in the art should understand that the technical solutions described in the foregoing embodiments may be modified, or some or all of the technical features may be equivalently replaced; however, these modifications or substitutions do not make the essence of corresponding technical solutions depart from of the scope of the embodiments of the present disclosure.

What is claimed is:

1. A display screen quality detection method, comprising:
receiving a quality detection request sent by a console deployed on a display screen production line, wherein the quality detection request comprises a display screen image captured by an image capturing device on the display screen production line;
performing image preprocessing on the display screen image, wherein the image preprocessing comprises one or more of following processes:
trimming, cutting, rotating, reducing, and zooming;
inputting the preprocessed display screen image into a defect detection model to obtain a defect detection result, wherein the defect detection model is obtained by training with a historical defect display screen image using a deep convolutional neural network structure and an instance segmentation algorithm; and determining, according to the defect detection result, quality of a display screen corresponding to the display screen image;

wherein the defect detection model is a result obtained by performing combined training with candidate region loss, region category loss, region boundary loss, and pixel instance loss of the historical defect display screen image to make a total loss value of the candidate region loss, the region category loss, the region boundary loss, and the pixel instance loss meet a preset loss threshold;

wherein the candidate region loss refers to a loss value between a selected defect region and an actual defect region in the historical defect display screen image, the region category loss refers to a loss value between a predicted defect category and an actual defect category in the selected defect region, the region boundary loss refers to a loss between a predicted defect boundary and an actual defect boundary in the selected defect region, and the pixel instance loss refers to a loss between a predicted pixel instance and an actual pixel instance in the historical defect display screen image.

2. The method according to claim 1, wherein the inputting the preprocessed display screen image into a defect detection model to obtain a defect detection result, comprises:

determining, according to a load balancing policy, a detection model server that hosts a processing resource; and inputting the preprocessed display screen image into the defect detection model running on the detection model server to obtain the defect detection result.

3. The method according to claim 1, wherein the defect detection result comprises at least one of: a defect category, a defect instance, or a defect location; and the determining, according to the defect detection result, quality of a display screen corresponding to the display screen image, comprises:

determining, according to production stage information and the defect detection result, the quality of the display screen corresponding to the display screen image.

4. The method according to claim 1, wherein after the determining, according to the defect detection result, quality of a display screen corresponding to the display screen image, the method further comprises:

if it is determined that the display screen is a bad screen, performing one or more of following operations:

sending, through a controller, alarm information to a production manager;

storing, through the controller, the defect detection result in a production database as a log;

sending, through the controller, a production control instruction to the console to eliminate a defect; and inputting the display screen image and the defect detection result into the defect detection model to optimize the defect detection model.

5. A display screen quality detection apparatus, wherein the display screen quality detection apparatus comprises: a processor, a memory, and a computer program stored on the memory and operable on the processor, and the processor executes the computer program to:

receive a quality detection request sent by a console deployed on a display screen production line, wherein the quality detection request comprises a display screen image captured by an image capturing device on the display screen production line;

perform image preprocessing on the display screen image, and input the preprocessed display screen image into a defect detection model to obtain a defect detection result, wherein the image preprocessing comprises one or more of following processes: trimming, cutting, rotating, reducing, and zooming, and wherein the defect detection model is obtained by training with a historical defect display screen image using a deep convolutional neural network structure and an instance segmentation algorithm; and determine, according to the defect detection result, quality of a display screen corresponding to the display screen image;

wherein the defect detection model is a result obtained by performing combined training with candidate region loss, region category loss, region boundary loss, and pixel instance loss of the historical defect display screen image, to make a total loss value of the candidate region loss, the region category loss, the region boundary loss and the pixel instance loss meet a preset loss threshold;

wherein the candidate region loss refers to a loss value between a selected defect region and an actual defect region in the historical defect display screen image, the region category loss refers to a loss value between a predicted defect category and an actual defect category in the selected defect region, the region boundary loss refers to a loss between a predicted defect boundary and an actual defect boundary in the selected defect region, and the pixel instance loss refers to a loss between a predicted pixel instance and an actual pixel instance in the historical defect display screen image.

6. The apparatus according to claim 5, wherein the processor executes the computer program to determine, according to a load balancing policy, a detection model server that hosts a processing resource, and input the display screen image into the defect detection model running on the detection model server to obtain the defect detection result.

7. The apparatus according to claim 5, wherein the defect detection result comprises at least one of: a defect category, a defect instance, or a defect location; and the processor executes the computer program to determine, according to production stage information and the defect detection result, the quality of the display screen corresponding to the display screen image.

8. The apparatus according to claim 5, wherein the processor further executes the computer program to: after the determining, according to the defect detection result, the quality of the display screen corresponding to the display screen image, if it is determined that the display screen is a bad screen, perform one or more of following operations:

send, through a controller, alarm information to a production manager;

store, through the controller, the defect detection result in a production database as a log;

send, through the controller, a production control instruction to the console to eliminate a defect; and input the display screen image and the defect detection result into the defect detection model to optimize the defect detection model.

9. A non-transitory storage medium, wherein the non-transitory storage medium stores instructions that, when run on a computer, cause the computer to perform following steps:
- receiving a quality detection request sent by a console deployed on a display screen production line, wherein the quality detection request comprises a display screen image captured by an image capturing device on the display screen production line;
- performing image preprocessing on the display screen image, wherein the image preprocessing comprises one or more of following processes:
- trimming, cutting, rotating, reducing, and zooming;
- inputting the preprocessed display screen image into a defect detection model to obtain a defect detection result, wherein the defect detection model is obtained by training with a historical defect display screen image using a deep convolutional neural network structure and an instance segmentation algorithm; and
- determining, according to the defect detection result, quality of a display screen corresponding to the display screen image;
- wherein the defect detection model is a result obtained by performing combined training with candidate region loss, region category loss, region boundary loss, and pixel instance loss of the historical defect display screen image to make a total loss value of the candidate region loss, the region category loss, the region boundary loss, and the pixel instance loss meet a preset loss threshold;
- wherein the candidate region loss refers to a loss value between a selected defect region and an actual defect region in the historical defect display screen image, the region category loss refers to a loss value between a predicted defect category and an actual defect category in the selected defect region, the region boundary loss refers to a loss between a predicted defect boundary and an actual defect boundary in the selected defect region, and the pixel instance loss refers to a loss between a predicted pixel instance and an actual pixel instance in the historical defect display screen image.

10. The non-transitory storage medium according to claim 9, wherein the inputting the preprocessed display screen image into a defect detection model to obtain a defect detection result, comprises:
- determining, according to a load balancing policy, a detection model server that hosts a processing resource; and
- inputting the preprocessed display screen image into the defect detection model running on the detection model server to obtain the defect detection result.

11. The non-transitory storage medium according to claim 9, wherein the defect detection result comprises at least one of: a defect category, a defect instance, or a defect location; and
- the determining, according to the defect detection result, quality of a display screen corresponding to the display screen image, comprises:
- determining, according to production stage information and the defect detection result, the quality of the display screen corresponding to the display screen image.

12. The non-transitory storage medium according to claim 9, wherein after the determining, according to the defect detection result, quality of a display screen corresponding to the display screen image, the method further comprises:
- if it is determined that the display screen is a bad screen, performing one or more of following operations:
- sending, through a controller, alarm information to a production manager;
- storing, through the controller, the defect detection result in a production database as a log;
- sending, through the controller, a production control instruction to the console to eliminate a defect; and
- inputting the display screen image and the defect detection result into the defect detection model to optimize the defect detection model.

* * * * *